Sept. 22, 1936.  A. H. AVERY  2,055,274
CALIPERING DEVICE
Filed Jan. 15, 1934
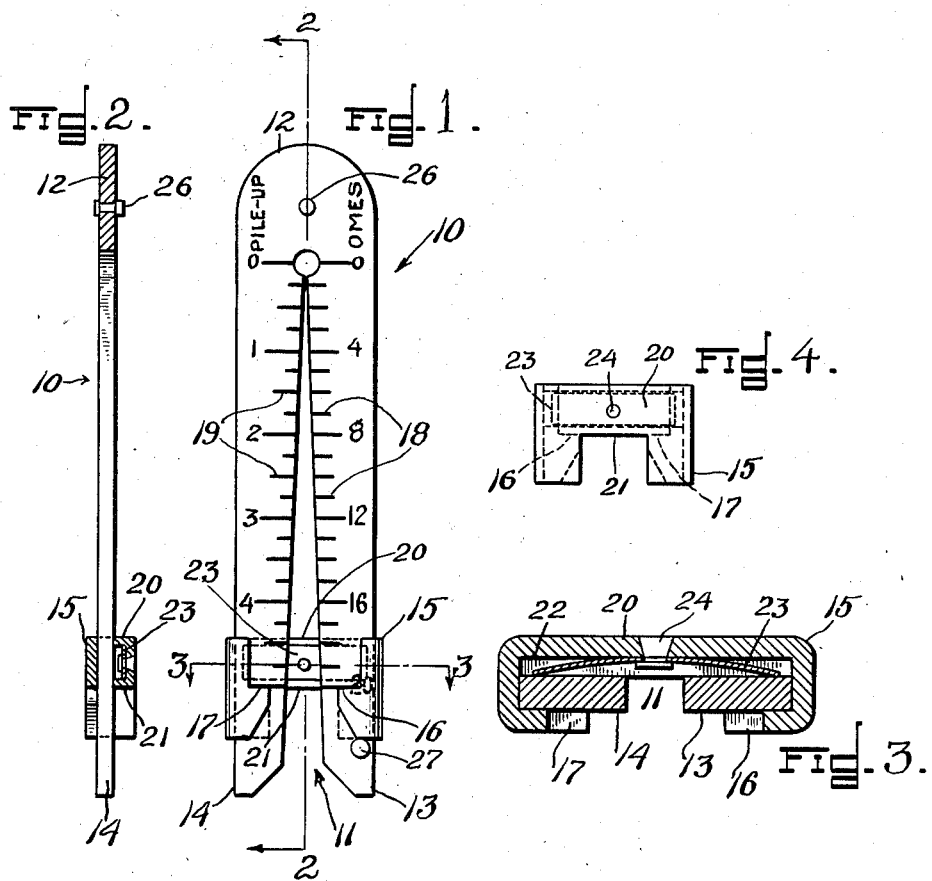

Patented Sept. 22, 1936

2,055,274

UNITED STATES PATENT OFFICE 2,055,274

CALIPERING DEVICE

Alfred H. Avery, Malden, Mass., assignor to North American Holding Corporation, Syracuse, N. Y., a corporation of New York Application January 15, 1934, Serial No. 706,594

2 Claims. (Cl. 33—168)

This invention relates to a hand-operated calipering device for use in measuring the thickness grades of soles, taps, heel lifts and other pieces or blanks of leather used in the shoe and leather industries. Blanks of the kind mentioned are usually classified and graded in accordance with the thickness of the thinnest part of the blank or the thinnest part of a selected area of the blank. The marginal area of a blank or a selected part of the marginal area, such as the marginal area of the forepart of a sole, is commonly regarded as the area which determines the classification of the blank.

For measuring such blanks there has long been in use in shoe manufacturing and kindred industries a hand-calipering instrument known as a grading iron. A grading iron consists of a V-shaped piece of metal on one or both legs of which is marked a graduated scale to indicate the thickness measurement of the edge of a blank inserted as far as it will go in the V-shaped opening between the legs. The unit of measurement generally used in measuring pieces of leather and other blanks used in the shoe and leather industry is called an iron, which is 1/48 of an inch. The graduated scale on the iron (the instrument) is therefore designated in terms of irons (the measurement) and fractions of irons.

In measuring a blank by means of the instrument called a grading iron, the blank is inserted edgewise into the V-shaped opening between the two legs of the iron until the edge of the blank is arrested by engagement with the inner diverging edges of the two legs. The thickness measurement of the edge of the blank, which engages the two legs of the instrument, may then be ascertained in terms of irons by reading the scale adjacent the edge of the blank. Obviously one such measurement of a blank would not show whether the spot measured was the thinnest spot or not. It is therefore the practice to apply the grading iron to the blank a number of times at different places around its edge and to read the thickness measurement of the blank each time as indicated by the scale, taking pains to keep in mind the thinnest measurement indicated by the scale, which determines the grade of the blank.

One object of the present invention is to provide an improved hand-operated calipering device which will register and record the thickness of the thinnest part of the blank to which the instrument is applied, thus eliminating mistakes which arise from the reliance of the operator on his memory of the readings on the old-fashioned irons.

Another object of the invention is to provide an improved calipering device for use in grading and sorting blanks according to their "pile-up" characteristics or according to their measurement in omes or both. It is an established practice in the shoe and leather industry to designate the thickness grade of leather blanks, whether evened or unevened, and particularly the thickness grade of soles for women's shoes, by the so-called "pile-up" characteristics of the shoes, by which is meant the height in inches of an arbitrary standard number of soles, usually 20 soles (10 pairs), of uniform thickness grade piled up or stacked one on top of another. For example, 2 inch "pile-up" soles means soles of such thickness that 20 of the soles will stack or pile-up to a height of 2 inches. Since an iron is 1/48 of an inch a 2 inch "pile-up" sole means a sole having a thickness grade of 4.8 irons. It is common practice for shoe manufacturers to order soles for women's shoes by designating the desired number of soles of the desired "pile-up" measurement rather than by designating the desired number of soles of a stated grade measurement in terms of irons. Thus, an order for so many 2½ inch "pile-up" soles means soles of such thickness that 20 soles will pile-up to a height of 2½ inches, in which case the thickness grade of each sole will be 6 irons. Or, an order for 1½ inch "pile-up" soles means soles of such thickness that 20 soles will pile-up to a height of 1½ inches, in which case the thickness grade of each sole will be 3.6 irons. The gradations of "pile-ups" customarily used by the trade differ from one another by intervals of ½ an inch, for example, a 2 inch "pile-up", a 2½ inch "pile-up", a 3 inch "pile-up", a 3½ inch "pile-up", and so on. Hence, the difference in thickness between soles of one "pile-up" class and the next "pile-up" class, either thicker or thinner by ½ an inch, is 1.2 irons or 1/40 of an inch.

Up to the present time the old-fashioned grading iron has been universally used for measuring soles and similar blanks by hand preparatory to sorting them according to their "pile-up" characteristics. Since said grading irons measured the blanks only in terms of irons, it was necessary to translate the measurement into "pile-up" measurements by a mental estimate and consequently the "pile-up" measurements could only be roughly approximated. With the present invention the measurement of the blank is instantly and accurately indicated both in terms of a new unit which I have named an "ome", and in terms of its "pile-up" characteristic in inches.

Although the gradations of "pile-ups" commonly used in the trade differ by ½ an inch, it would be entirely practicable, with the aid of the present invention, to classify the blanks according to a closer measurement and I shall describe herein a scale showing "pile-up" gradations in inches and quarter inches, making it possible to classify "pile-ups" differing from one another by ¼ of an inch instead of ½ an inch. The difference in thickness between the blanks for each ¼ inch difference in their "pile-up" characteristics is .6 of an iron or 1/80 of an inch, and this unit I have adopted as a unit of measurement of the individual soles classified according to their "pile-up" characteristics and have termed an ome. Since 1 ome represents the difference in thickness between the blanks in each "pile-up" class and the next "pile-up" class having a "pile-up" measurement of ¼ of an inch greater or smaller, there is a difference of 4 omes in the measurement of the blanks for each 1 inch difference in their "pile-up" characteristics, or a difference of 2 omes between the blanks of the different "pile-up" classes as commonly recognized, which classes differ from one another by ½ an inch according to the prevailing custom of the trade.

In the accompanying drawing,

Fig. 1 is a face view of a calipering device embodying the invention;

Fig. 2 is a section on line 2—2 of Fig. 1;

Fig. 3 is an enlarged cross section on line 3—3 of Fig. 1; and

Fig. 4 is a rear elevation of the indicating or recording slide.

The device comprises a body member 10 having two legs 13 and 14, the proximate edges of which diverge to form between them a V-shaped slot 11 into which the blank to be measured is inserted edgewise. The legs are connected by an integral part 12 which serves as a handle for holding and manipulating the device.

Mounted on the body member 10 is an indicator or recording slide herein shown as a sleeve 15, which embraces both legs and slides thereon. The outer edges of the legs are made parallel so that the sleeve fits snugly in all positions of its adjustment lengthwise of the body member. The slide is made with two transverse straight edges 16 and 17 aligned with each other. These straight edges are used for indicating the readings on the scales.

The leg 13 is provided with a scale 18 graduated in terms of omes. The leg 14 is provided with a scale 19 graduated in terms of "pile-up" characteristics in inches and quarter inches. It will be noted that the graduations of the two scales correspond and are in transverse alignment. The straight edges 16 and 17 of the slide cooperate respectively with the scales 18 and 19 and when one of the straight edges registers with a mark on its scale the other straight edge will register with a corresponding mark on its scale. These graduations are proportioned in length relatively to the angle between the legs so as to indicate the "pile-up" measurement and the measurement in omes of a blank whose thickness is the same as the width of the slot opposite the several graduations.

The recording slide 15 is also made with a transverse abutment bar 20 bridging the slot 11 and rigidly connecting the two channels at the sides of the slide. The outer or lower edge 21 of the abutment bar 20 is adapted for engagement with the edge of the blank to be measured when the blank is inserted edgewise into the slot. The lower edge 21 of the abutment or crossbar 20 is straight and perpendicular to the median line of the slot 11 and in alignment with the straight edges 16 and 17.

The abutment bar 20 of the slide is formed upon its rear or inner side with a recess 22 (Fig. 3) within which is disposed a small bow spring 23, whose middle bears against the bar 20 and whose free ends bear against legs 13 and 14 of the body member. The spring may be fastened at its middle to crossbar 20 by means of a rivet 24 and the ends of the spring bearing against the legs 13 and 14 serve yieldingly and frictionally to hold the slide 15 in its different positions of adjustment lengthwise on the body 10.

Stop studs 26 and 27 positioned near opposite ends of the body member prevent the removal of the slide from the body member.

In using the device the body member is held in one hand and the blank to be measured is held in the other hand and inserted edgewise into the slot 11 between the legs. The edge of the blank engages the abutment 21 and pushes the slide inward toward the converging end of the slot until the edge of the blank engages and is arrested by the walls of the slot. Since the straight edges 16 and 17 are in alignment with the abutment edge 21 of the crossbar, and consequently with the edge of the blank being measured, the straight edge 16 will indicate on scale 18 the measurement in omes and the straight edge 17 will indicate on scale 19 the measurement in "pile-up" characteristics of that spot of the blank thus measured. When the blank is withdrawn from the slot the recording slide, being frictionally mounted on the body member, will remain in the position into which it was adjusted by the blank. A similar operation may then be performed on as many different places about the periphery of the blank as desired to make a fair determination of its variations in thickness. Each time a thicker spot is encountered the blank will not reach the recording slide, which will remain unaffected, but each time a thinner spot is encountered the blank will push the slide farther inward toward the converging end of the slot a distance corresponding to the distance which the blank will go into the slot, with the result that after a series of such operations the recording slide will indicate the thinnest measurement thus ascertained both in terms of "pile-up" characteristics and in terms of omes.

If the straight edges 16 and 17 are left in position between markings on the scales 18 and 19 then the scale markings next above the positions indicated by the straight edges 16 and 17 in Fig. 1 (that is, the markings of the next thinner grade) are considered as indicating the minimum grade measurement of the blank, since it is customary to classify a sole which exceeds the measurement of one class but does not equal that of the next thicker class as belonging to the thinner class.

By using the described ome system of measurement, not only is the grade of the blank instantly and correctly indicated according to its "pile-up" characteristic, but its grade thickness in irons may be readily determined. For example, the "pile-up" characteristic of a sole which measures a given number of omes is the result obtained by dividing that number by 4, and is so indicated on scale 19; and the thickness in irons is determined by multiplying the number of omes by .6. Furthermore if a lot of soles of different thickness are measured according to their thicknesses in omes and thereafter evened by skiving so as to measure an even number of omes, all of the even soles will conform to standard "pile-up" classes.

I claim:

1. A calipering device for gauging the thickness of blanks of leather and like sheet material, comprising a body member having two legs the proximate edges of which diverge to form between them a V-shaped slot into which the blank to be measured is inserted edgewise and the outer edges of which are parallel to form a guideway of uniform width, a scale on the body member, and a recording slide mounted on the legs comprising two channels embracing respectively the two parallel outer edges of the legs and having a transverse abutment rigidly connecting the two channels and bridging the slot between the legs, the outer edge of said abutment being engageable with said leather or sheet material when inserted into said slot.

2. A calipering device for gauging the thickness of a blank of leather and like sheet material, comprising a body member having two legs rigidly connected together at one end, the proximate edges of said legs diverging to form between them a V-shaped slot into which the blank to be measured is inserted edgewise, said slot being wholly open and unobstructed at the free ends of the legs, the outer edges of said body member being parallel to form a guideway of uniform width, a scale on the body member, and a spring pressed recording slide spanning said slot in all positions and mounted to slide lengthwise along said guideway to a position determined by the extent to which the blank is inserted into the V-shaped slot through its open end, said slide having on its outer edge a transverse abutment for engagement with the edge of the blank to indicate on that point of the scale which is in alinement with the abutment the thickness of the extreme edge of the blank when the blank is inserted into the V-shaped slot as far as it will go.

ALFRED H. AVERY.